United States Patent [19]

Kertscher

[11] Patent Number: 5,676,892

[45] Date of Patent: Oct. 14, 1997

[54] INSTALLATION AND METHOD FOR MANUFACTURE OF AN OPTICAL FIBER CABLE

[75] Inventor: Eberhard Kertscher, Yvonand, Switzerland

[73] Assignee: E. Kertscher S.A., Yvonand, Switzerland

[21] Appl. No.: 532,563

[22] PCT Filed: Apr. 9, 1994

[86] PCT No.: PCT/EP94/01102

§ 371 Date: Oct. 13, 1995

§ 102(e) Date: Oct. 13, 1995

[87] PCT Pub. No.: WO94/24595

PCT Pub. Date: Oct. 27, 1994

[30] Foreign Application Priority Data

Apr. 14, 1993 [FR] France ................... 93 04491

[51] Int. Cl.⁶ ........................................ B29D 11/00
[52] U.S. Cl. ................ 264/1.28; 264/1.29; 264/568; 264/210.2; 425/114; 425/326.1
[58] Field of Search ................... 264/1.24, 1.28, 264/1.29, 566, 568, 210.2; 425/114, 326.1

[56] References Cited

U.S. PATENT DOCUMENTS

| 4,154,783 | 5/1979 | Jackson | 264/1.29 |
| 4,728,470 | 3/1988 | Einsle et al. | 264/1.29 |
| 4,772,435 | 9/1988 | Schlaeppi et al. | 264/1.29 |
| 4,814,116 | 3/1989 | Oestreich et al. | 264/1.24 |
| 4,861,525 | 8/1989 | Oestreich | 264/1.29 |

FOREIGN PATENT DOCUMENTS

| 0 185 615 | 6/1986 | European Pat. Off. . | |
| 0 193 940 | 9/1986 | European Pat. Off. . | |
| 0 275 994 | 7/1988 | European Pat. Off. . | |
| 0 286 819 | 10/1988 | European Pat. Off. . | |
| 3 229 024 | 4/1984 | Germany . | |
| 229073 | 10/1985 | Germany | 264/1.28 |

Primary Examiner—Mathieu D. Vargot
Attorney, Agent, or Firm—Griffin, Butler Whisenhunt & Kurtossy

[57] ABSTRACT

An optical fiber cable, including optical fibers and a tube housing the fibers, is made by a process wherein optical fibers are fed from one or more pay-out device to the interior of an extrusion head which also receives a sheathing material in viscous form. The extrusion head extrudes the viscous material to form a sheath surrounding, but out of contact with the fibers. With the fibers still out of contact with the sheath, the fibers and sheath pass through a jig which calibrates the sheath to the final form of the tube, and cools the viscous material in a first stage of solidification. Thereafter, the cable comprising the tube and optical fibers is would up around a first draw-in device and heat treated. From the first draw-in device the cable passes to a second draw-in device with the tension of the cable between the two draw-in devices being regulated.

17 Claims, 2 Drawing Sheets

5,676,892

1

INSTALLATION AND METHOD FOR MANUFACTURE OF AN OPTICAL FIBER CABLE

FIELD OF THE INVENTION

The present invention concerns a method as well as an installation for the manufacture of an optical fiber cable.

BACKGROUND OF THE INVENTION

Known optical fiber cables include a bundle of fibers assembled together in the form of layers, of already cabled fibers or of strips which are surrounded by a first outer tube of rigid or flexible structure formed by extrusion of a synthetic material.

In certain applications, optical fibers are housed in a loose manner on the interior of the tube and a viscous material such as a protection grease known under the British name "jelly" is injected into the interior of the tube in order to embed said fibers in the latter.

The manufacture of this type of cable is brought about in a manner such that the fibers on the interior of the tube exhibit relative thereto a selected excessive length obtained by the influence and the combination of different parameters throughout the entire manufacturing chain.

In the known methods and installations presently used, the optical fibers are unwound from a pay-out device including a feed reel freely mounted in rotation on an axle, the tension of the unwound fiber being controlled so as to remain constant.

Such fiber is thereafter drawn down through an extrusion head in which synthetic material at a high temperature in a viscous form is supplied around said fibers in order to form the protection tube hereinbefore mentioned in a manner coaxial to and on the exterior of the fibers.

At this point, the grease or "jelly" is injected in order to fill the tube and for coating the optical fibers in the latter.

After this extrusion step, the plastic tube is cooled in a first cooling receiver and is urged in traction in being wound around a first draw-in reel. The method is continued by the passage of the tube through another cooling receiver and through another draw-in reel with a control of the tractions on such tube through the use of strain gauges.

Such method and installation give satisfaction but solely up to a limit diameter of the tube and up to a limited number of fibers on the interior of the tube. Effectively, and in particular, beyond a tube diameter of 6 mm, the appearance of defects is ascertained in the outer form of the tube, but also in the excess length of the fibers as well as in the aspect of its outer surface. Is is thus very difficult to obtain a tube exhibiting a smooth outer surface and the excessive length also becomes difficult to control.

SUMMARY OF THE INVENTION

An object, the present invention is to provide a method and an installation for the manufacture of an optical fiber cable enabling the overcoming of such drawbacks and thanks to which the smooth aspect and the circular form of the tube surrounding the fibers can be controlled, whatever be the number of fibers on the interior of the latter,whilst moreover enabling a sufficient control of the excess length on such fibers.

A object of the invention is to provide a method of manufacture of an optical fiber cable including a tube in which said fibers are housed, characterized in that it includes the following steps in which:

2 a) optical fibers are brought from one or several pay-out devices, b) such fibers are introduced into the interior of an extrusion head supplying a sheathing material in viscous form extruded from said head around the fibers, c) at the output of the extrusion head, the sheathing material is directly preformed so as to cause it to take its definitive geometric form corresponding to that of the solid tube before and while it envelops said fibers, d) the cable made up from the tube and fibers is rolled up around a first drawn-in reel, then e) the cable is cooled in order next to cause it to pass through a second draw-in reel, while maintaining constant the tension between the two draw-in reels.

A further object of the invention is provided an installation for the manufacture of an optical fiber cable comprising:

pay-out means capable of supplying optical fibers, for example under the form of ribbon, and extrusion means of a sheathing material arranged after the pay-out means and through which said fibers are brought, characterized in that it further includes calibrating means for the sheathing material, such means which are arranged following the extrusion means, being capable of maintaining the sheathing material in a preformed form corresponding in solid form to the definitive geometric form of a tube intended to surround the fibers and this before and while the material envelops said fibers.

BRIEF DESCRIPTION OF THE DRAWINGS

Other objects, characteristics and advantages of the invention will appear upon reading of the detailed description which follows prepared having reference to the attached drawings which are given solely byway of example and in which.

DESCRIPTION OF PREFERRED EMBODIMENTS

In referring initially to FIGS. 3a and 3b, there will be described hereinafter two optical fiber cables according to two embodiments obtained by the method and by the installation according to the invention, which will be described in a more detailed fashion hereinafter.

Such cables, which are here identified by the general reference 1, each comprise an outer tube 2 formed of a flexible or preferably rigid synthetic material such as polyamide, polybutylene terephthalate or polypropylene. On the interior of tube 2 which, as is seen on FIG. 3, exhibits a circular form in cross-section, are housed a certain number of optical fibers 4 (a single one being here referenced) assembled together in the form of sheets or strips 6a according to the embodiment of FIG. 3a. As is seen on such figure, the layers or strips 6a are maintained relative to the outer tube 2 at a radial distance d from the latter, so that the layers or strips 6a do not touch the inner wall of the tube 2.

Figure 3B:
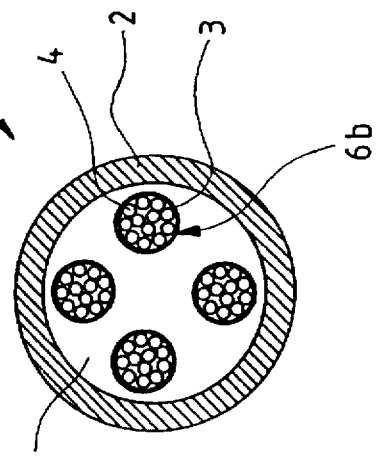
Figure 3A:
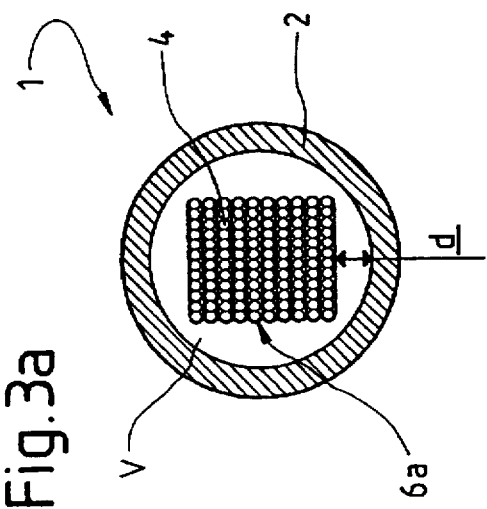

In conformity with the embodiment of FIG. 3b, the optical fibers 4 are amalgamated among themselves in four bundles or cables 6b respectively maintained and surrounded by a retention tube 3. Each bundle 6b and in particular its retention tube 3 is arranged at a distance d from the outer tube 2 in which is injected the grease or "jelly" V. The invention, as is well understood, is not limited to the obtaining of cables according to FIGS. 3a and 3b which are shown here by way of example.

A viscous material V, such as a protection grease, generally known under the British name "jelly", is injected into the interior of tube 2 in order to fill the free space left between the tube 2 and the optical fiber layers or strips referenced 6a or the cabled bundles 6b.

In referring henceforth to FIG. 1, there will be described hereinafter an installation for the manufacture of the cable 1 in conformity with the invention, such installation being identified by the general reference 10.

In the rest of the description, the terms "upstream" and "downstream" will be used with reference to the sense of running of the optical fibers 4 and more generally with reference to the sense of running of cable 1 in the installation 10 in conformity with arrow D.

Furthermore, the term "optical fibers" accompanied by reference 4, will be used to qualify generally fibers in the form of strips referenced 6a or the form of already sheathed bundles referenced 6b, and this in order to facilitate the rest of the description.

At its upstream portion, installation 10 is provided with pay-out means 12 which include several feed reels (not shown) on which the optical fibers 4 are rolled.

Figure 1:
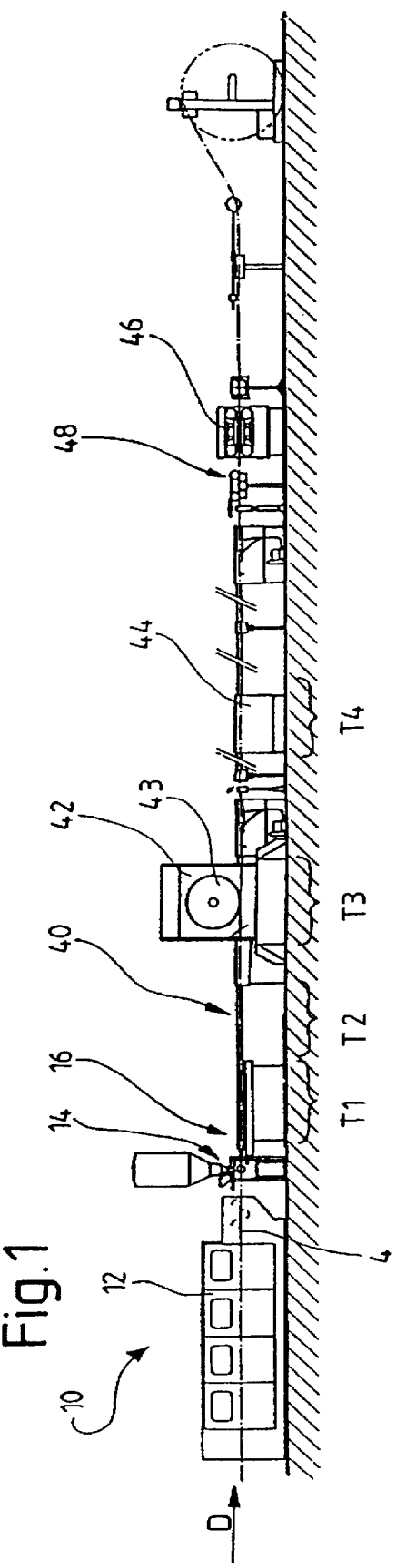
FIG. 1 is a schematic view and an elevation of an installation for manufacture of an optical fiber cable according to the invention.
Figure 2:
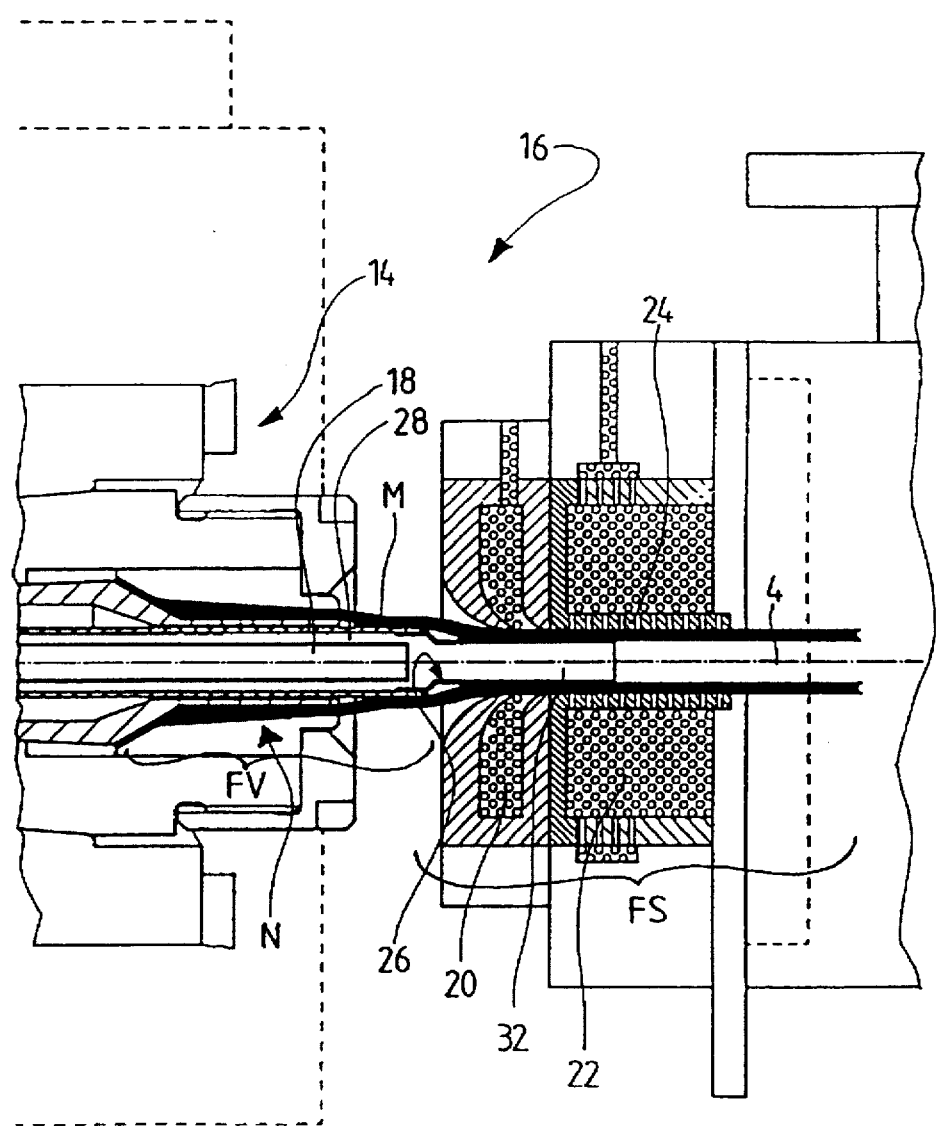
FIG. 2 is a longitudinal cross-section view of an extrusion head and a jig of the installation of FIG. 1, and FIGS. 3a and 3b are transverse cross-section views of two optical fiber cables obtained by the method and the installation according to the invention.

The optical fibers 4 which are shown in a schematic manner on FIG. 1 by an interrupted dash-and-dot line, are drawn from the pay-out means 12 in order to pass through an extrusion head 14 shown in a more detailed manner on FIG. 2. Such extrusion head 14 which is basically of known structure is capable of carrying under fusion a synthetic material, generally supplied in granulated or compounded form, by heating to very high temperatures.

At the output of the extrusion head 14, the material (referenced M on FIG. 2) which is delivered in the viscous state and at very high temperatures (fusion temperature) is forced into displacement under pressure in the downstream direction around an extrusion die N which gives the material M the form of a hollow envelope.

This viscous form of the material M obtained at the output of the extrusion head 14 at the level of the die N, is identified on FIG. 2 by the reference FV.

Downstream of the extrusion head 14 is arranged a jig 16 in which are introduced the fibers 4 which have previously traversed the extrusion head in the form of layers, of strips or of sleeved bundles, as well as the sheathing material M in its viscous form FV in a manner coaxial to the latter..

In a preferred embodiment of the invention, there is also introduced into jig 16 the protection grease V intended to fill the tube 2.

Reference will be carried over henceforth to FIG. 2 which shows, in a more detailed manner, the extrusion head 14 as well as the entry of the jig 16.

On such figure, the optical fibers 4 have likewise been shown in a schematic manner by an interrupted dot-and-dash line.

The extrusion head 14 being of basically standard conception will not be here described in a detailed manner.

It is simply specified that the optical fibers 4 are introduced from behind into the extrusion head 14 through a tubular guide 18 which advances up to the level of the die N around which arrives the material M, in its viscous form FV.

As is see on such figure, the optical fibers 4 next pass through the jig 16 and penetrate further ahead into a part of the latter which is shown on such figure in a partial and very schematic manner.

Jig 16 includes two chambers 20 and 22 in which a fluid such as water circulates at a temperature T1 on the order of 10° to 50° C. More specifically, such temperature is maintained between 15° and 25° C. and can, in certain cases, be brought to 40° C.

Jig 16 which is also known under the name of calibration receiver is in itself of known conception and also will not be further here described in a very detailed manner.

It will simply be mentioned that the circulation of water in the interior of chambers 20 and 22 (circulation which is permitted by a vacuum pump of the water ring pump type, not shown) causes a partial vacuum to appear on the interior of chamber 22, but under a controlled temperature. Such cooling temperature assures a first stage of solidification of the extruded synthetic material M.

Jig 16 includes a calibration socket 24 against which the material M is applied by suction thanks to the vacuum phenomenon mentioned hereinabove, such material M which is thus found to be preformed by the mechanical and thermal actions of the jig 16 thereby assuming a solid form referenced FS, corresponding to the definitive geometric form of the tube referred to as the solid tube, referenced 2 on FIG. 3.

It will be further noted that the extrusion die N includes a feed neck 26 which is arranged in a manner coaxial to the tubular guide 18 and in which circulates at least the optical fibers 4. In a variant of the preferred embodiment, the protection grease or "jelly" V (FIG. 3) is also caused to circulate on the interior of the feed neck 26.

The feed neck 26 physically isolates the optical fibers 4 as well as the grease V from all contact with the sheathing material M, at least over an introduction distance of the sheathing material M into the interior of the calibration socket 24 on jig 16, such distance being sufficiently great to enable the preforming of the tube 2 by solidification of material M, prior to any contact of such material with the fibers 4 and the protection grease V.

In effect it will be noted on FIG. 2 that the feed neck 26 penetrates in a coaxial manner into the interior of the calibration socket 24 as well as into the first cooling ring formed by chamber 20. Thereby, the material M, before entering into jig 16 is already interiorly guided by the feed neck 26 of the extrusion die N and begins its solidification in a progressive manner by the cooling due to the action of the water vaporized at temperature T1 in chambers 20 and 22.

Material M having begun its solidification, is held in this form, that is to say preformed, by the cooling ring, against the calibration socket 24 which leads progressively to the formation of the tube 2 of FIG. 3.

In the variant embodiment shown, the protection grease or "jelly" is injected into the interior of tube 2 via the feed neck 26.

To this end, as is seen on FIG. 2, the installation according to the invention includes, in a manner coaxial to the tubular guide 18, a peripheral chamber 28 for feeding the protection grease (here not shown) which is introduced by a back connection coupled to a pipe, itself connected to a receptacle or container (not shown). The protection grease is thus forced to circulate in the annular chamber 28 coaxial to the optical fibers 4 up to a mixing chamber 32 formed in the feed neck 26.

It is thus noted that the assembly "protection grease-optical fibers" comes into contact with material M only when such material has been introduced into the jig 16, and more specifically following its introduction into the interior of the calibration socket 24.

Here it will be noted that the protection grease of "jelly" can be brought to a temperature on the order of 30° to 250° C. according to the excess length which is desired on the optical fibers 4.

It will thus be understood from what has just been described that there has been provided an installation including downstream of the pay-out reels 12, extrusion means 14 for the feeding material M as well as calibration means 16, 24 for such material, which are themselves arranged downstream of the extrusion means 14. It will be understood that in this arrangement the calibration means 16, 24 are capable of maintaining the sheathing material in a preformed form corresponding to the definitive geometric form of tube 2 once it is solid, and this before and while the material M envelops the fibers 4 and the protection grease V.

In referring henceforth to FIG. 1, there will be described the different units of the installation 10 according to the invention arranged downstream of the jig 16. Thus, following jig 16 is arranged a first receiver 40 at a controlled temperature in which circulates a liquid at a temperature T2 greater than or equal to the temperature T1 of jig 16.

Downstream of such first receiver 40, there is arranged a main drawn-in reel 42 which is formed by wheel 43 of large diameter (on the order of 600 to 2500 mm). Within the draw-in reel 42, which forms a vertical reheat receiver, a temperature T3 greater than the temperature T2 is maintained, chosen as a function of the excess length desired on the optical fibers 4.

Next, downstream of such main draw-in reel 40, there is arranged a second cooling receiver 44 maintained at a temperature T4 generally lower than temperatures T2 and T3.

The installation 10 further includes a secondary draw-in reel 46 arranged substantially at the end of the manufacturing chain. Furthermore, a tension regulator 48 is arranged between the principal draw-in reel 42 and the secondary draw-in reel 46 in order to assure a controlled tension of cable 1 between the two draw-in reels 42 and 46.

Thus, it is understood that there has been provided a manufacturing method and installation for an optical fiber cable in which the material M intended to form tube 2 surrounding the optical fibers 4, enters immediately under its viscous form FV into the jig 16 so as to be directly preformed at the output of the extrusion head 14 and to assume the definitive geometric form of the tube in its solid form before and while the optical fibers 4 and the protection grease or "jelly" V penetrates into the interior of tube 2. Furthermore, it is ascertained that the material M is preformed in cooling it to the temperature T1, which temperature is provided thanks to a supply of cold water to jig 16. Furthermore, after the sheathing material M intended to constitute tube 2 has been preformed in jig 16, the sleeved cable 1 is introduced into the receiver 40, the controlled temperature of which is maintained at a temperature T2 greater than or equal to the temperature T1 in order that the tube 2 be reheated once it has left the jig 16.

I claim:

1. A method of manufacture of an optical fiber cable including a solid tube in which said fibers are housed, comprising the following steps, in which:

a) optical fibers are brought from at least one pay-out reel, b) the optical fibers are introduced into the interior of an extrusion head while supplying a sheathing material around the fibers so as to constitute a hollow envelope extruded in viscous form, c) directly from the output of the extrusion head the fibers and the extruded hollow envelope are introduced into the interior of a jig which cools the material to a temperature T1 and which guides the cross section of the hollow extruded envelope so as to bring it to a stage of solidification while causing it by calibration to assume its final form, corresponding to that of the solid tube before and while such sheathing material envelops said fibers, d) the cable made up from the tube and fibers is rolled up around a first draw-in reel, then e) the cable is cooled, and, f) thereafter the cable is passed through a second draw-in reel while maintaining constant the tension between the two draw-in reels.

2. A method as set forth in claim 1, wherein protection grease is injected into the interior of the tube after the material forming the hollow extruded envelope has been introduced into the jig.

3. A method as set forth in claim 1, wherein the sheathing material is calibrated by causing it to pass through a jig under vacuum which applies the material by exterior suction against a calibration socket exhibiting a predetermined diameter, corresponding to the final form of the tube.

4. A method as set forth in claim 1, wherein the cable is heated following its exit from the jig until its exit from the first draw-in reel.

5. A method as set forth in claim 1, wherein temperature T1 is between 10° and 40° C.

6. A method as set forth in claim 3, wherein the sheathing material is cooled by the circulation of a cooling liquid at the temperature T1 through the socket of the jig.

7. A method as claimed in claim 1 wherein the cable, following its exit from the jig to its exit from the first draw-in reel, is maintained at a temperature T2 which is at least equal to the temperature T1, and is heated to a temperature T3 which is greater than the temperature T2.

8. A method as set forth in claim 7, wherein the sheathed cable at the output of the jig is introduced into a container at a controlled temperature maintained at temperature T2.

9. A method as set forth in claim 7, wherein the first draw-in reel is maintained at temperature T3 which is greater than temperatures T1 and T2.

10. An installation for the manufacture of an optical fiber cable including a solid tube in which optical fibers are housed, comprising:

pay-out means for supplying optical fibers, and, extrusion means arranged following the pay-out means through which said fibers are led, such extrusion means supplying a sheathing material around the fibers constituting a hollow extruded envelope in viscous form, and including a jig arranged following the extrusion means, such jig cooling the extruded material to a temperature T1 in guiding the cross section of the hollow extruded envelope so as to bring it to a stage of solidification while causing it by calibration to assume its final form, corresponding to that of the solid tube, before and while such sheathing material envelops said fibers.

11. An installation as set forth in claim 10, wherein the jig includes a calibration socket arranged at the output of the extrusion means.

12. An installation as set forth in claim 11, wherein the jig is under vacuum so as to be capable of applying by the exterior the sheathing material at the output of the extrusion means against the calibration socket.

13. An installation as set forth in claim 11, further including an arrangement for putting a cooling liquid into circulation in the interior of the jig around the calibration socket.

14. An installation as set forth in claim 11, including a feed neck intended to bring the fibers and a protecting grease having to fill the tube to the output of the extrusion means, such feed neck, which penetrates to the interior of the calibration socket, maintaining the sheathing material isolated at the same time from the fibers and said protecting grease at the time of entry of the material into the calibration socket so as to avoid all contact of such material with the fibers and the grease before the cooling of said material.

15. A method of manufacturing an optical fiber cable, said method comprising the steps of:

feeding optical fibers from at least one pay-out reel to an extrusion head;

supplying a sheathing material to the extrusion head;

extruding the sheathing material from the extrusion head to form a tube with the optical fibers enclosed in said tube, the optical fibers being maintained out of contact with the tube during the extruding;

while said optical fibers are still maintained out of contact with the tube, feeding the tube with the optical fibers therein through a jig to calibrate the tube to its final form, and, bringing the calibrated tube to a stage of solidification while still maintaining the optical fibers out of contact with the tube.

16. A method as set forth in claim 15, wherein protection grease is injected into the interior of the tube after the material forming the tube has been introduced into the jig.

17. A method as set forth in claim 15, wherein the sheathing material is calibrated by causing it to pass through a jig under vacuum which applies the material by exterior suction against a calibration socket exhibiting a predetermined diameter, corresponding to the final form of the tube.

* * * * *